(12) United States Patent
Toll et al.

(10) Patent No.: US 12,346,264 B2
(45) Date of Patent: Jul. 1, 2025

(54) PERFORMING INSTRUCTION FETCH PIPELINE SYNCHRONIZATION (IFPS) IN PROCESSOR-BASED DEVICES

(71) Applicant: Ampere Computing LLC, Santa Clara, CA (US)

(72) Inventors: Bret Leslie Toll, Hillsboro, OR (US); Benjamin Crawford Chaffin, Portland, OR (US); George Van Horn Leming, III, Lake Oswego, OR (US); Jonathan Christopher Perry, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 78 days.

(21) Appl. No.: 18/381,557

(22) Filed: Oct. 18, 2023

(65) Prior Publication Data

US 2025/0130953 A1 Apr. 24, 2025

(51) Int. Cl.
*G06F 12/1027* (2016.01)
*G06F 12/0855* (2016.01)

(52) U.S. Cl.
CPC ...... *G06F 12/1027* (2013.01); *G06F 12/0855* (2013.01)

(58) Field of Classification Search
CPC .......... G06F 12/1027; G06F 12/0855
See application file for complete search history.

(56) References Cited

U.S. PATENT DOCUMENTS

| | | | | |
|---|---|---|---|---|
| 11,263,043 B1* | 3/2022 | Mukherjee | ........... | G06F 9/3836 |
| 12,229,561 B1* | 2/2025 | Hari | ...................... | G06F 9/3818 |
| 2017/0286110 A1* | 10/2017 | Agron | ................. | G06F 9/30145 |
| 2019/0095204 A1* | 3/2019 | Zbiciak | ............... | G06F 12/0831 |

* cited by examiner

*Primary Examiner* — Francisco A Grullon
(74) *Attorney, Agent, or Firm* — Withrow & Terranova, PLLC (57) ABSTRACT

Performing instruction fetch pipeline synchronization (IFPS) in processor-based devices is disclosed herein. In some exemplary aspects, a processor-based device provides multiple processors including a remote processor. The remote processor receives, from an issuing processor, a translation lookaside buffer (TLB) invalidation (TLBI) request indicating a request to invalidate an address translation, and subsequently receives an IFPS request from the issuing processor. The remote processor determines that any previously received TLBI requests including the most recent TLBI request have completed. Upon receiving the IFPS request, the remote processor determines that all instructions within a fetch pipeline portion that were potentially fetched using address translations older than the IFPS request have proceeded from the fetch pipeline portion of an instruction processing circuit to an execution pipeline portion of the instruction processing circuit. The remote processor then performs a data synchronization barrier (DSB) operation, and issues a synchronization acknowledgement to the issuing processor.

20 Claims, 6 Drawing Sheets

PERFORMING INSTRUCTION FETCH PIPELINE SYNCHRONIZATION (IFPS) IN PROCESSOR-BASED DEVICES

BACKGROUND

I. Field of the Disclosure

The technology of the disclosure relates generally to management of address translations in processor-based devices, and, in particular, to synchronization operations that are performed in response to translation lookaside buffer (TLB) invalidate (TLBI) requests.

II. BACKGROUND

Microprocessors, also referred to herein as "processors," perform computational tasks for a wide variety of applications. Conventional processor-based devices employ a memory management mechanism known as "virtual memory" that allows memory addresses (i.e., virtual addresses or VAs) referenced by executing processes to be mapped to physical addresses (PAs) within system memory. The use of virtual memory by such processor-based devices enables access to a virtual memory space that is larger than the actual physical memory space, and enhances inter-process security through memory isolation.

The mapping of VAs to their corresponding PAs is accomplished using data structures known as page tables. To further improve performance, page table entries retrieved from the page tables during VA-to-PA translations are cached in a data structure referred to as a translation lookaside buffer (TLB). TLBs provided by a processor-based device may include instruction TLBs (iTLBs) that cache translations of VAs from which computer-executable instructions are fetched, and/or data TLBs (dTLBs) that cache translations of VAs from which data is read or to which data is written. As new VA-to-PA translations are generated, a TLB is updated to store the new translations to handle current and/or anticipated data needs.

In processor-based devices that comprise multiple processors or processor cores (each of which may include multiple TLBs), mechanisms are provided to ensure that translations stored across the different TLBs remain synchronized, thereby avoiding coherency issues. Conventional instruction set architectures (ISAs) provide a system whereby an issuing processor may broadcast a TLB invalidate (TLBI) request to other remote processors within the processor-based device to invalidate any "stale" (i.e., invalidated) TLB entries within the TLBs of the remote processors. In addition, the issuing processor may send a Data Synchronization Barrier (DSB) request to the remote processors to ensure that all data-side uses of the stale TLB entries have been removed from the system. However, to prevent the use of stale TLB entries when retrieving instructions, each remote processor in the processor-based device may need to halt execution, flush its instruction pipeline, and then restart execution. This results in disruption of the operations of every remote processor and causes each remote processor to incur additional latency.

SUMMARY OF THE DISCLOSURE

Aspects disclosed in the detailed description include performing instruction fetch pipeline synchronization (IFPS) in processor-based devices. Related apparatus and methods are also disclosed. In this regard, in some exemplary aspects disclosed herein, a processor-based device provides a plurality of processors including a remote processor that is communicatively coupled to an issuing processor. As used herein, the term "issuing processor" refers to a processor or processor core that broadcasts an address translation lookaside buffer (TLB) invalidation (TLBI) request to invalidate an address translation (e.g., an address translation stored in an instruction TLB (iTLB) or a data TLB (dTLB)), while the term "remote processor" refers to a processor or processor core that receives such broadcasts. In exemplary operation, the remote processor receives, from the issuing processor, the TLBI request indicating a request to invalidate an address translation (i.e., one or more address translations). The remote processor subsequently receives an IFPS request from the issuing processor. The IFPS request in some aspects may be broadcast in response to the issuing processor executing, e.g., an existing data synchronization barrier (DSB) instruction of the issuing processor's instruction set architecture (ISA) that is modified to include an indicator bit to indicate that IFPS operations are to be performed, or a new IFPS instruction provided by the ISA of the issuing processor.

Upon receiving the IFPS request, the remote processor first ensures that any previously received TLBI requests have completed, and then continues processing until all instructions within a fetch pipeline portion of an instruction processing circuit of the remote processor that were potentially fetched using address translations older than the request have proceeded from the fetch pipeline portion to an execution pipeline portion of the instruction processing circuit. When the remote processor determines that all instructions within the fetch pipeline portion that were potentially fetched using address translations older than the IFPS request have proceeded from the fetch pipeline portion to the execution pipeline portion, the remote processor performs a DSB operation, and then issues a synchronization acknowledgement to the issuing processor. In this manner, the remote processor can ensure that the fetch pipeline portion is free of any stale translation usage without negatively impacting the performance of the remote processor or interrupting the currently executing instructions.

According to aspects in which the IFPS request is broadcast by the issuing processing executing an existing DSB instruction that is modified to include the indicator bit, the remote processor may be configured to determine that all instructions within the fetch pipeline portion that were potentially fetched using address translations older than the IFPS request have proceeded from the fetch pipeline portion to the execution pipeline portion in response to the indicator bit of the DSB instruction being set (e.g., to a value of one (1), as a non-limiting example). In some aspects, each instruction of a plurality of instructions in the fetch pipeline portion of the instruction processing circuit may correspond to a tracking bit of a plurality of tracking bits. According to such aspects, the remote processor may be configured to determine that all instructions within the fetch pipeline portion that were potentially fetched using address translations older than the IFPS request have proceeded from the fetch pipeline portion to the execution pipeline portion based on the plurality of tracking bits. For example, the instructions in the fetch pipeline portion prior to the remote processor receiving the IFPS request may all have their corresponding tracking bits set to a first value. In response to receiving the IFPS request, the remote processor may begin setting the tracking bits of new instructions entering the fetch pipeline portion to a second value. The remote processor may then determine that all instructions within the fetch pipeline portion that were potentially fetched using address translations older than the IFPS request have proceeded from the fetch pipeline portion to the execution pipeline portion by determining that all instructions having tracking bits set to the first value have proceeded from the fetch pipeline portion to the execution pipeline portion.

In another aspect, a processor-based device is disclosed. The processor-based device comprises a plurality of processors including a remote processor. The remote processor comprises an instruction processing circuit that includes a fetch pipeline portion and an execution pipeline portion. The remote processor is configured to receive, from an issuing processor, a TLBI request indicating a request to invalidate an address translation. The remote processor is further configured to subsequently receive an IFPS request from the issuing processor. The remote processor is also configured to, responsive to receiving the IFPS request, determine that any previously received TLBI requests including the TLBI request have completed. The remote processor is additionally configured to determine that all instructions within the fetch pipeline portion that were potentially fetched using address translations older than the IFPS request have proceeded from the fetch pipeline portion to the execution pipeline portion. The remote processor is further configured to, responsive to determining that all instructions within the fetch pipeline portion that were potentially fetched using address translations older than the IFPS request have proceeded from the fetch pipeline portion to the execution pipeline portion, perform a DSB operation, and issue a synchronization acknowledgement to the issuing processor.

In another aspect, a processor-based device is disclosed. The processor-based device comprises means for receiving, from an issuing processor, a TLBI request indicating a request to invalidate an address translation. The processor-based device further comprises means for subsequently receiving an IFPS request from the issuing processor. The processor-based device also comprises means for determining that any previously received TLBI requests including the TLBI request have completed, responsive to receiving the IFPS request. The processor-based device additionally comprises means for determining that all instructions within a fetch pipeline portion of an instruction processing circuit of a remote processor of a plurality of processors of the processor device that were potentially fetched using address translations older than the IFPS request have proceeded from the fetch pipeline portion to an execution pipeline portion of the instruction processing circuit. The processor-based device further comprises means for performing a DSB operation, responsive to determining that all instructions within the fetch pipeline portion that were potentially fetched using address translations older than the IFPS request have proceeded from the fetch pipeline portion to the execution pipeline portion. The processor-based device also comprises means for issuing a synchronization acknowledgement to the issuing processor.

In another aspect, a method for performing IFPS in processor-based devices is disclosed. The method comprises receiving, by a remote processor of a plurality of processors of a processor-based device from an issuing processor, a TLBI request indicating a request to invalidate an address translation. The method further comprises subsequently receiving, by the remote processor, an IFPS request from the issuing processor. The method also comprises, responsive to receiving the IFPS request, determining, by the remote processor, that any previously received TLBI requests including the TLBI request have completed. The method additionally comprises determining, by the remote processor, that all instructions within a fetch pipeline portion of an instruction processing circuit of the remote processor that were potentially fetched using address translations older than the IFPS request have proceeded from the fetch pipeline portion to an execution pipeline portion of the instruction processing circuit. The method further comprises, responsive to determining that all instructions within the fetch pipeline portion that were potentially fetched using address translations older than the IFPS request have proceeded from the fetch pipeline portion to the execution pipeline portion, performing, by the remote processor, a DSB operation. The method also comprises issuing, by the remote processor, a synchronization acknowledgement to the issuing processor.

In another aspect, a non-transitory computer-readable medium is disclosed. The non-transitory computer-readable medium stores computer-executable instructions that, when executed, cause a processor of a processor-based device to receive, from an issuing processor, a TLBI request indicating a request to invalidate an address translation. The computer-executable instructions further cause the processor to subsequently receive an IFPS request from the issuing processor. The computer-executable instructions also cause the processor to, responsive to receiving the IFPS request, determine that any previously received TLBI requests including the TLBI request have completed. The computer-executable instructions additionally cause the processor to determine that all instructions within a fetch pipeline portion of an instruction processing circuit of a remote processor of a plurality of processors of the processor-based device that were potentially fetched using address translations older than the IFPS request have proceeded from the fetch pipeline portion to an execution pipeline portion of the instruction processing circuit. The computer-executable instructions further cause the processor to, responsive to determining that all instructions within the fetch pipeline portion that were potentially fetched using address translations older than the IFPS request have proceeded from the fetch pipeline portion to the execution pipeline portion, perform a DSB operation. The computer-executable instructions also cause the processor to issue a synchronization acknowledgement to the issuing processor.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like (e.g., "first value," "second value") are used herein to distinguish between similarly named elements, and are not intended to be construed as indicating an ordinal relationship between or among such elements unless expressly specified.

Aspects disclosed in the detailed description include performing instruction fetch pipeline synchronization (IFPS) in processor-based devices. Related apparatus and methods are also disclosed. In this regard, in some exemplary aspects disclosed herein, a processor-based device provides a plurality of processors including a remote processor that is communicatively coupled to an issuing processor. As used herein, the term "issuing processor" refers to a processor or processor core that broadcasts an address translation lookaside buffer (TLB) invalidation (TLBI) request to invalidate an address translation (e.g., an address translation stored in an instruction TLB (iTLB) or a data TLB (dTLB)), while the term "remote processor" refers to a processor or processor core that receives such broadcasts. In exemplary operation, the remote processor receives, from the issuing processor, the TLBI request indicating a request to invalidate an address translation. The remote processor subsequently receives an IFPS request from the issuing processor. The IFPS request in some aspects may be broadcast in response to the issuing processor executing, e.g., an existing data synchronization barrier (DSB) instruction of the issuing processor's instruction set architecture (ISA) that is modified to include an indicator bit to indicate that IFPS operations are to be performed, or a new IFPS instruction provided by the ISA of the issuing processor.

Upon receiving the IFPS request, the remote processor first ensures that any previously received TLBI requests have completed, and then continues processing until all instructions within a fetch pipeline portion of an instruction processing circuit of the remote processor that were potentially fetched using address translations older than the request have proceeded from the fetch pipeline portion to an execution pipeline portion of the instruction processing circuit. When the remote processor determines that all instructions within the fetch pipeline portion that were potentially fetched using address translations older than the IFPS request have proceeded from the fetch pipeline portion to the execution pipeline portion, the remote processor performs a DSB operation, and then issues a synchronization acknowledgement to the issuing processor. In this manner, the remote processor can ensure that the fetch pipeline portion is free of any stale translation usage without negatively impacting the performance of the remote processor or interrupting the currently executing instructions.

According to aspects in which the IFPS request is broadcast by the issuing processing executing an existing DSB instruction that is modified to include the indicator bit, the remote processor may be configured to determine that all instructions within the fetch pipeline portion that were potentially fetched using address translations older than the IFPS request have proceeded from the fetch pipeline portion to the execution pipeline portion in response to the indicator bit of the DSB instruction being set (e.g., to a value of one (1), as a non-limiting example). In some aspects, each instruction of a plurality of instructions in the fetch pipeline portion of the instruction processing circuit may correspond to a tracking bit of a plurality of tracking bits. According to such aspects, the remote processor may be configured to determine that all instructions within the fetch pipeline portion that were potentially fetched using address translations older than the IFPS request have proceeded from the fetch pipeline portion to the execution pipeline portion based on the plurality of tracking bits. For example, the instructions in the fetch pipeline portion prior to the remote processor receiving the IFPS request may all have their corresponding tracking bits set to a first value. In response to receiving the IFPS request, the remote processor may begin setting the tracking bits of new instructions entering the fetch pipeline portion to a second value. The remote processor may then determine that all instructions within the fetch pipeline portion that were potentially fetched using address translations older than the IFPS instruction have proceeded from the fetch pipeline portion to the execution pipeline portion by determining that all instructions having tracking bits set to the first value have proceeded from the fetch pipeline portion to the execution pipeline portion.

Before discussing IFPS operations in greater detail, the operations performed by an issuing processor when initiating a conventional TLB invalidation process are first described. In this regard, Table 1 illustrates an exemplary instruction sequence that may be performed by an issuing processor among multiple processors of a processor-based device:

TABLE 1

| Instruction Sequence | Description |
| --- | --- |
| STR Xd, [Xn] | Updates to the page table entry (PTE) |
| DSB <sy> | Ensure global observation of PTE update |
| TLBI VAE1<nsh \| is \| os> Xt | Invalidate TLB entries for updated PTE |
| DSB <sy> | Ensure completion of TLBI |
| ISB | Synchronizes context on this processor |

The instruction sequence illustrated in Table 1 updates a page table entry (PTE) of the issuing processor, and ensures that any TLB entries stored in TLBs of other remote processors are also updated. Thus, the issuing processor first executes a store (STR) instruction to update the PTE by storing a value stored in a register Xd into a memory location indicated by an address Xn, and next executes a DSB instruction to ensure global observation of the PTE update by all processors of the processor-based device as indicated by the "sy" parameter. The issuing processor then executes a TLBI instruction that causes a TLBI request to be broadcast to other remote processors to instruction the remote processors to invalidate any TLB entries for the PTE in any TLBs of the remote processors. The issuing processor also executes a DSB instruction that causes a DSB request to be broadcast to the remote processors to instruct the remote processors to perform DSB operations to ensure that older translations and memory requests are updated before the updated TLB is used for new translations. Finally, the issuing processor executes an instruction synchronization barrier (ISB) instruction to synchronize the context on the issuing processor by flushing its instruction pipeline so that all instructions following the ISB instruction (in program order) are fetched from cache or memory.

In response to the broadcast of the first DSB request, each remote processor conventionally performs a DSB operation. In addition, to prevent the use of stale TLB entries when retrieving instructions, each remote processor must flush its instruction pipeline and then restart execution. This results in disruption of the operations of every remote processor and causes each remote processor to incur additional latency.

Figure 1:
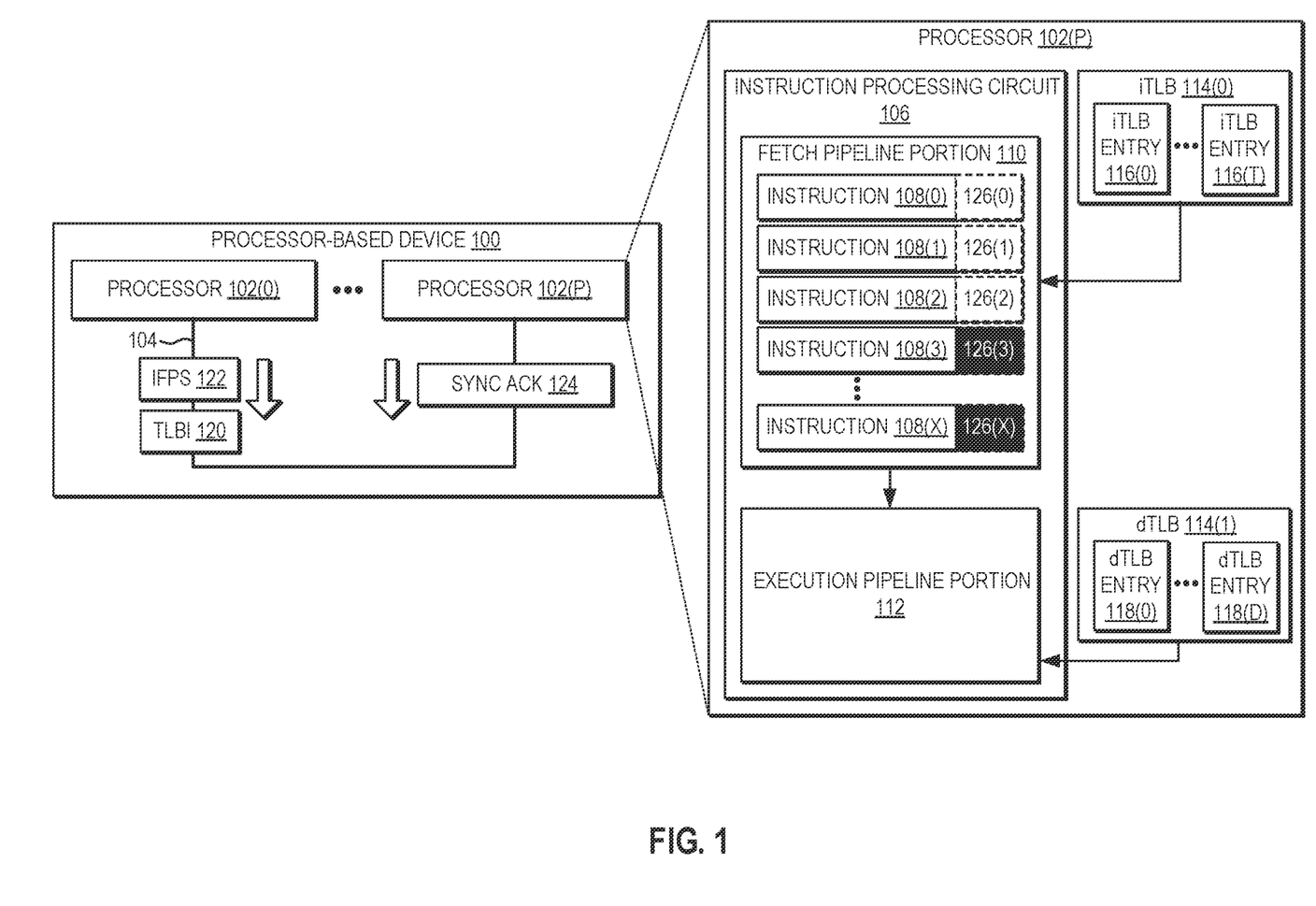
FIG. 1 is a block diagram of an exemplary processor-based device that includes a remote processor configured to perform instruction fetch pipeline synchronization (IFPS), according to some aspects.

To avoid this disruption and additional latency, aspects disclosed herein are configured to provide functionality for performing IFPS operations. In this regard, FIG. 1 illustrates an exemplary processor-based device 100 that includes a plurality of processors 102(0)-102(P) (also referred to as "processor cores" or "central processing unit (CPU) cores"), which may be in-order or out-of-order processors (OoPs) and may be implemented on one System-on-Chip (SoC) or distributed across multiple SoCs. The plurality of processors 102(0)-102(P) are communicatively coupled via an interconnect bus 104.

The processor-based device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based device 100 and/or the processors 102(0)-102(P) may include elements in addition to those illustrated in FIG. 1, and/or may include more or fewer of the elements illustrated in FIG. 1. For example, the processor-based device 100 may further include caches, controllers, communications buses, and/or persistent storage devices, which are omitted from FIG. 1 for the sake of clarity.

FIG. 1 further illustrates exemplary elements of the processor 102(P). It is to be understood that, while not shown in FIG. 1, each of the processors 102(0)-102(P) includes elements corresponding to the elements of the processor 102(P) illustrated herein. As seen in FIG. 1, the processor 102(P) comprises an instruction processing circuit 106 that is configured to fetch and execute computer-executable instructions (captioned as "INSTRUCTION" in FIG. 1) 108(0)-108(X) from, e.g., a system memory (not shown) or an instruction cache (not shown). The instruction processing circuit 106 in some aspects may comprise multiple pipeline stages, not shown in FIG. 1 for the sake of clarity, through which at least some of the computer-executable instructions are processed in sequence. The pipeline stages may include, as non-limiting examples, a fetch stage, a decode stage, a rename state, a register access state, a scheduling stage, an execution stage, and a writeback stage. The functionality of the instruction processing circuit 106 is divided generally into a fetch pipeline portion 110 that comprises all pipeline stages up to the execution stage, and an execution pipeline portion 112 that comprises all stages from the execution stage onward.

The processor 102(P) also comprises an iTLB 114(0) that provides a plurality of iTLB entries 116(0)-116(T), and further comprises a dTLB 114(1) that provides a plurality of dTLB entries 118(0)-118(D). Each of the iTLB 114(0) and the dTLB 114(1) may be referred to generally as a "TLB 114" herein. The iTLB entries 116(0)-116(T) and the dTLB entries 118(0)-118(D) cache address translations, and may comprise corresponding TLB tags (not shown) and data elements (not shown), and/or additional metadata not shown in FIG. 1, such as validity indicators, global indicators, and/or memory properties such as type and access permissions.

In exemplary operation, a TLBI request (captioned as "TLBI" in FIG. 1) 120 is received at a remote processor (e.g., the processor 102(P) of FIG. 1) from an issuing processor (e.g., the processor 102(0) of FIG. 1). The TLBI request 120 may be sent by the issuing processor as a result of executing a TLBI instruction (not shown), and identifies one or more address translations to be invalidated (e.g., by invalidating or clearing one or more corresponding entries of an associated TLB). In some aspects, the TLBI request 120 may include one or more identifiers that includes any of a virtual machine identifier (VMID), an address space identifier (ASID), and a virtual address identifier (VAID), and thus is an instruction to the remote processor 102(P) to invalidate cache entries for the VMID, ASID (if specified), and VAID (if specified) included in the TLBI request 120. Upon receiving the TLBI request 120, the remote processor 102(P) may invalidate one or more of the iTLB entries 116(0)-116(T) of the iTLB 114(0) that correspond to the address translation(s) indicated by the TLBI request 120, and/or may invalidate one or more of the dTLB entries 118(0)-118(D) of the dTLB 114(1) that correspond to the address translation(s) indicated by the TLBI request 120.

In the example of FIG. 1, the remote processor 102(P) subsequently receives an IFPS request (captioned as "IFPS" in FIG. 1) 122 from the issuing processor 102(0). The IFPS request 122 may be sent by the issuing processor 102(0) as a result of executing an IFPS instruction (not shown), and instructs the remote processor 102(P) to synchronize the fetch pipeline portion 110 of the instruction processing circuit 106 by waiting for any of the instructions 108(0)-108(X) within the fetch pipeline portion 110 that were potentially fetched using address translations older than the IFPS request 122 to proceed from the fetch pipeline portion 110 to the execution pipeline portion 112. This ensures that no stale address translations are in use within the fetch pipeline portion 110. The IFPS request 122 further instructs the remote processor 102(P) to perform a DSB operation in conventional fashion once the fetch pipeline portion 110 is free of any potential stale address translation usage. As discussed in greater detail below with respect to FIGS. 2A and 2B, the IFPS instruction executed by the issuing processor 102(0) to broadcast the IFPS request 122 may comprise an existing DSB instruction that is modified to include an indicator bit to indicate that IFPS functionality is to be performed, or may comprise a new IFPS instruction provided by the ISA of the processor-based device 100.

Upon receiving the IFPS request 122, the remote processor 102(P) continues processing until it determines that any previously received TLBI requests, including the TLBI request 120, have completed, to ensure that any stale address translations have been removed from the TLBs 114 of the remote processor 102(P). The remote processor 102(P) then continues instruction execution while monitoring the fetch pipeline portion 110. Once the remote processor 102(P) determines that all instructions within the fetch pipeline portion 110 that were potentially fetched using address translations older than the IFPS request 122 have proceeded from the fetch pipeline portion 110 to the execution pipeline portion 112 of the instruction processing circuit 106, the remote processor 102(P) performs a DSB operation. The remote processor 102(P) then issues a synchronization acknowledgement (captioned as "SYNC ACK" in FIG. 1) 124 to the issuing processor 102(0).

Some aspects may provide that the remote processor 102(P) is configured to determine which of the instructions 108(0)-108(X) within the fetch pipeline portion 110 that were potentially fetched using address translations older than the IFPS request 122 based on tracking bits 126(0)-126(X) that correspond to the instructions 108(0)-108(X). For example, before the instructions 108(0)-108(X) arrive in the fetch pipeline portion 110, the tracking bits 126(0)-126(2) of the instructions 108(0)-108(2) may be set to a first value, represented by the white background of the tracking bits 126(0)-126(2) in FIG. 1. In response to receiving the IFPS request 122, the remote processor 102(P) may set the tracking bits 126(3)-126(X) of the new (i.e., subsequently received) instructions 108(3)-108(X) entering the fetch pipeline portion 110 to a second value, represented by the black background of the tracking bits 126(3)-126(X) in FIG. 1. The remote processor 102(P) may then determine that all instructions within the fetch pipeline portion 110 that were potentially fetched using address translations older than the IFPS request 122 have proceeded from the fetch pipeline portion 110 to the execution pipeline portion 112 by determining that all of the instructions 108(0)-108(2) having tracking bits 126(0)-126(2) set to the first value have proceeded from the fetch pipeline portion 110 to the execution pipeline portion 112.

Figure 2A:
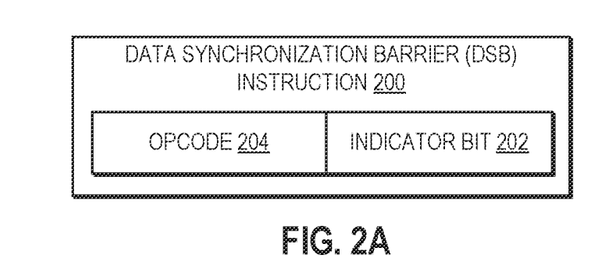
FIGS. 2A and 2B are block diagrams illustrating in greater detail exemplary aspects of an instruction that may be executed by the issuing processor of FIG. 1 to cause the IFPS request of FIG. 1 to be broadcast, according to some aspects.

FIGS. 2A-2B illustrate exemplary implementations of an IFPS instruction executed by the issuing processor 102(0) of FIG. 1 to broadcast the IFPS request 122 of FIG. 1 according to some aspects. In FIG. 2A, the IFPS instruction is implemented by modifying an existing DSB instruction 200 provided by the ISA of the issuing processor 102(0) of FIG. 1 to include an indicator bit 202 in addition an opcode 204 of the DSB instruction 200. When the remote processor 102(P) receives the IFPS request 122 broadcast as a result of the issuing processor 102(0) executing the DSB instruction 200 with the indicator bit 202 set, the IFPS operations discussed above with respect to FIG. 1 are performed by the remote processor 102(P). Once the IFPS operations are complete, the remote processor 102(P) then performs DSB operations in conventional fashion. When the remote processor 102(P) receives a DSB request (not shown) broadcast as a result of the issuing processor 102(0) executing the DSB instruction 200 with the indicator bit 202 not set, the remote processor 102(P) only performs DSB operations in conventional fashion, without performing the IFPS operations discussed above.

Figure 2B:
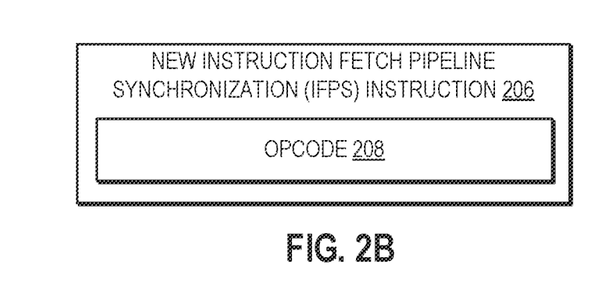

In FIG. 2B, the IFPS instruction is implemented using a new IFPS instruction 206 provided by the ISA of the issuing processor 102(0) of FIG. 1, and comprising an opcode 208. When the remote processor 102(P) receives the IFPS request 122 broadcast by the issuing processor 102(0) executing the new IFPS instruction 206, the IFPS operations discussed above with respect to FIG. 1 are performed by the remote processor 102(P), followed by a conventional DSB operation. Aspects according to FIG. 2B may provide that the IFPS request 122 is broadcast to the remote processor 102(P) in a same or similar manner as conventional DSB request synchronization protocols.

Figure 3A:
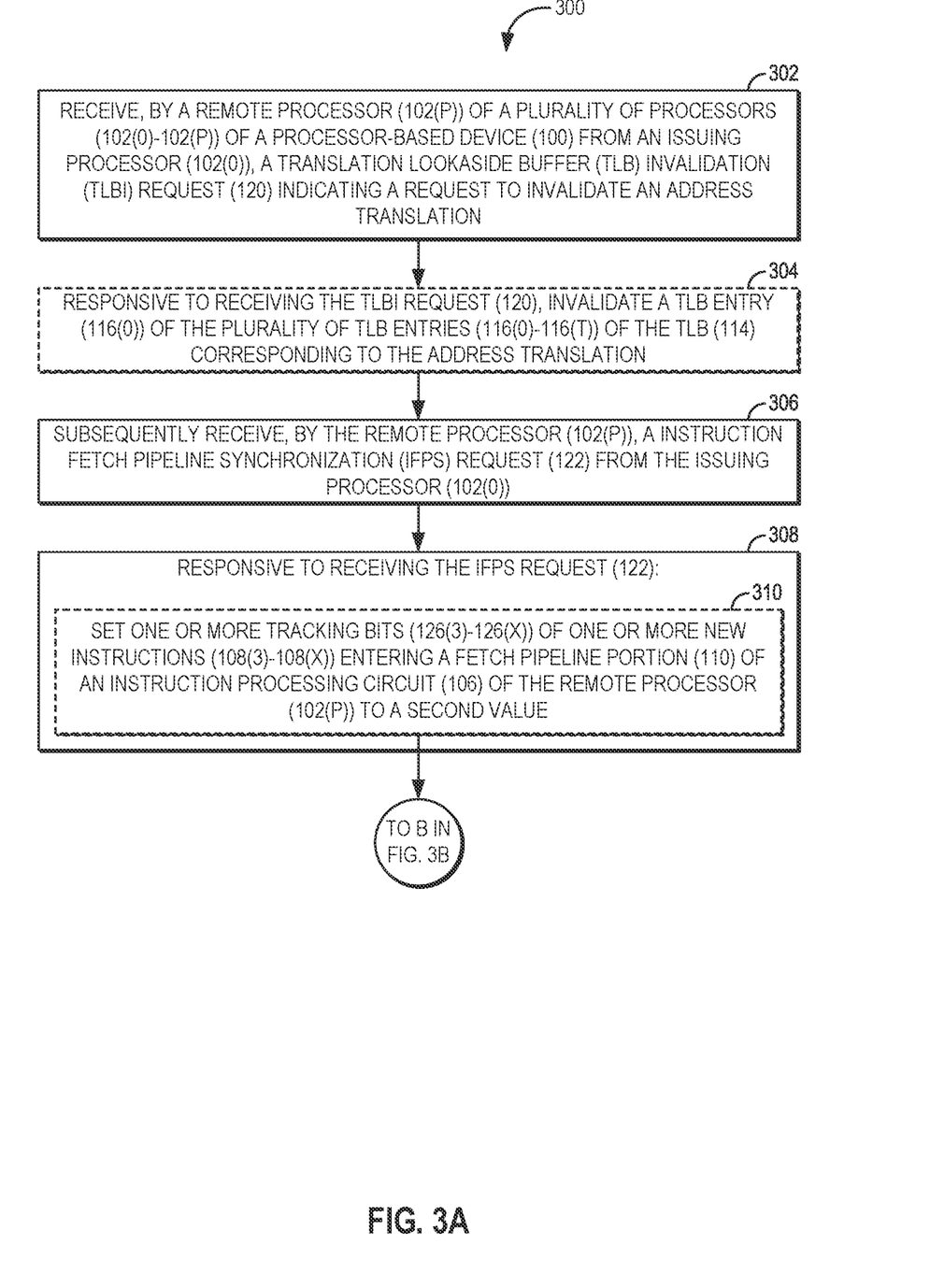
FIGS. 3A-3C provide a flowchart illustrating exemplary operations of the remote processor of FIG. 1 for performing IFPS operations, according to some aspects.
Figure 3B:
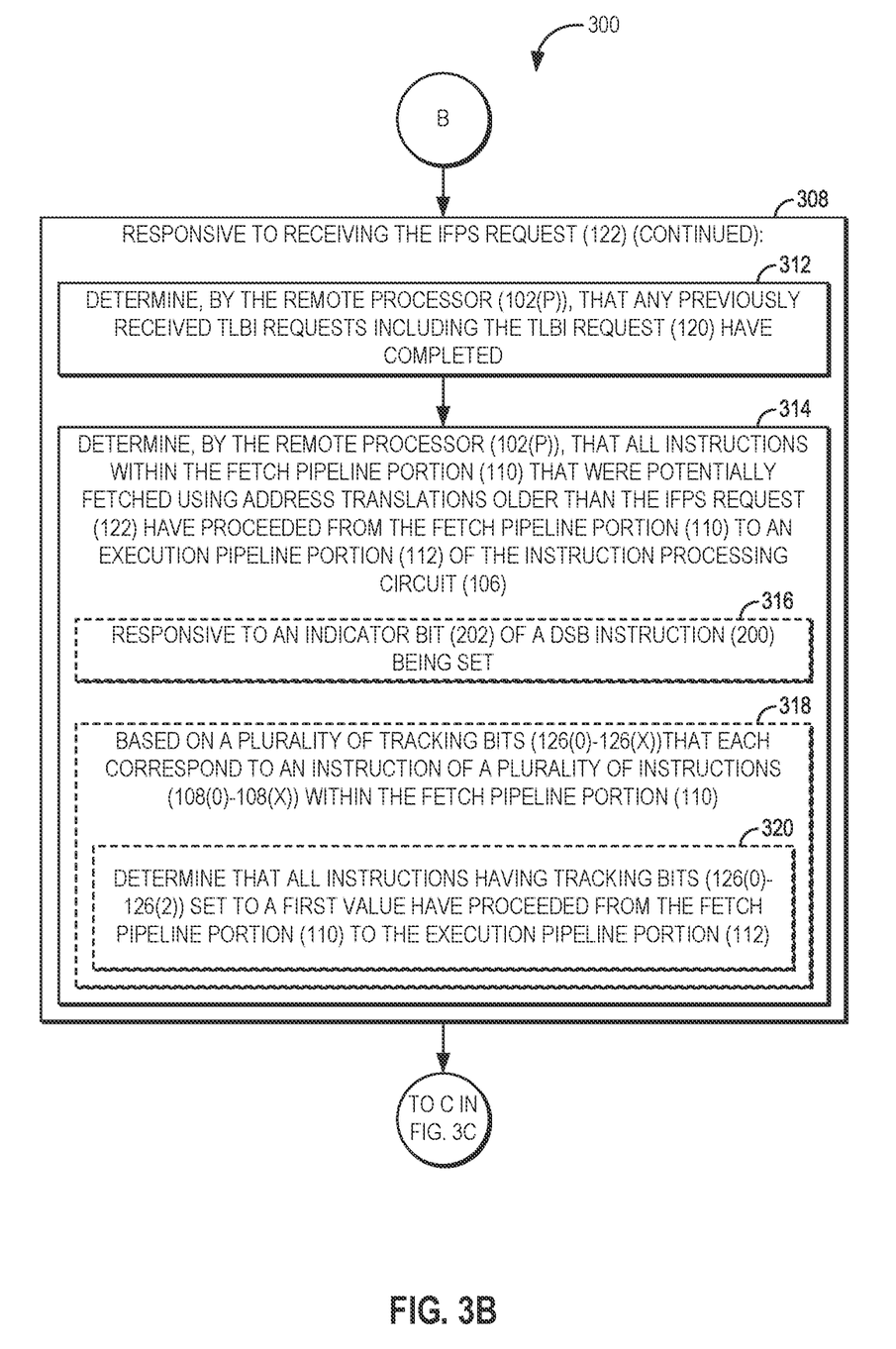
Figure 3C:
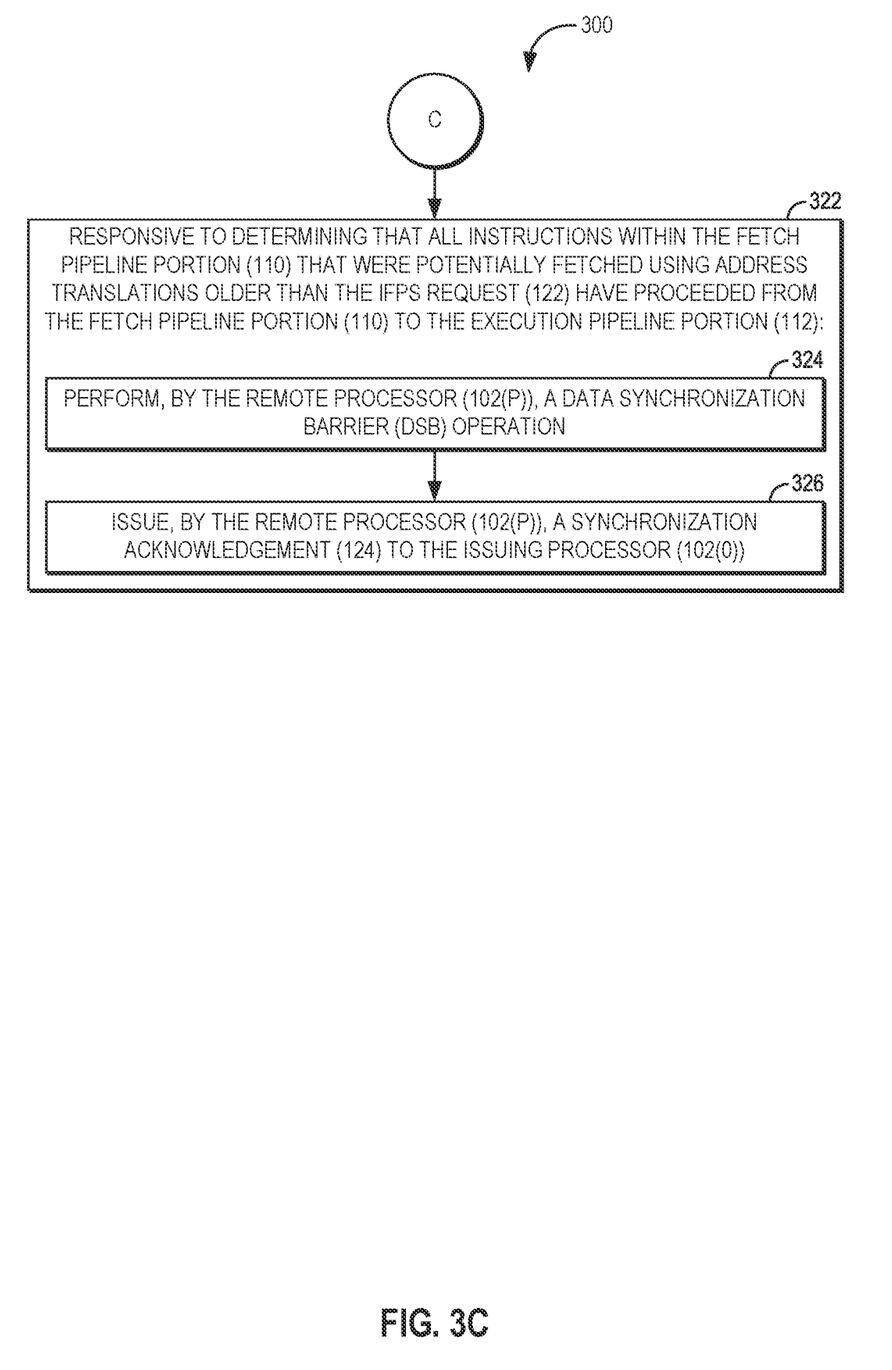

To illustrate exemplary operations of the processor-based device 100 for performing IFPS operations according to some aspects, FIGS. 3A-3C provide a flowchart illustrating exemplary operations 300. For the sake of clarity, elements of FIGS. 1 and 2A-2B are referenced in describing FIGS. 3A-3C. It is to be understood that, in some operations, some of the exemplary operations 300 may be performed in an order other than that illustrated herein, and/or may be omitted.

The exemplary operations 300 begin in FIG. 3A with a remote processor of a plurality of processors of a processor-based device (e.g., the processor 102(P) of the plurality of processors 102(0)-102(P) of the processor-based device 100 of FIG. 1) receiving, from an issuing processor (such as the processor 102(0) of FIG. 1), a TLBI request (e.g., the TLBI request 120 of FIG. 1) indicating a request to invalidate an address translation (block 302). Some aspects may provide that the remote processor 102(P), in response to receiving the TLBI request 120, invalidates a TLB entry of a plurality of TLB entries of a TLB (e.g., the TLB entry 116(0) of the plurality of TLB entries 116(0)-116(T) of the TLB 114 of FIG. 1) corresponding to the address translation (block 304). The remote processor subsequently receives an IFPS request (e.g., the IFPS request 122 of FIG. 1) from the issuing processor 102(0) (block 306). The IFPS request 122 may be sent as a result of the issuing processor 102(0) executing, e.g., the DSB instruction 200 of FIG. 2A or the IFPS instruction 206 of FIG. 2B, as non-limiting examples.

In response to receiving the IFPS request 122, the remote processor 102(P) performs a series of operations (block 308). In some aspects, the remote processor 102(P) may set one or more tracking bits (e.g., the tracking bits 126(3)-126(X) of FIG. 1) of one or more new instructions (such as the instructions 108(3)-108(X) of FIG. 1) entering a fetch pipeline portion of an instruction processing circuit (such as the fetch pipeline portion 110 of the instruction processing circuit 106 of FIG. 1) of the remote processor 102(P) to a second value (block 310). The exemplary operations 300 continue at block 312 of FIG. 3B.

Turning now to FIG. 3B, some aspects may provide that further operations are performed in response to receiving the IFPS request 122 (block 308). The remote processor 102(P) determines that any previously received TLBI requests have completed (block 312). The remote processor 102(P) then determines that all instructions within the fetch pipeline portion 110 that were potentially fetched using address translations older than the IFPS request 122 have proceeded from the fetch pipeline portion 110 to an execution pipeline portion (e.g., the execution pipeline portion 112 of FIG. 1) of the instruction processing circuit 106 (block 314). According to aspects in which the IFPS request 122 is sent as a result of the issuing processor 102(0) executing the DSB instruction 200, the operations of block 314 for determining that all instructions within the fetch pipeline portion 110 that were potentially fetched using address translations older than the IFPS request 122 have proceeded from the fetch pipeline portion 110 to the execution pipeline portion 112 may be performed responsive to an indicator bit (e.g., the indicator bit 202 of FIG. 2A) of the DSB instruction 200 being set (block 316). Some aspects may provide that the operations of block 314 for determining that all instructions within the fetch pipeline portion 110 that were potentially fetched using address translations older than the IFPS request 122 have proceeded from the fetch pipeline portion 110 to the execution pipeline portion 112 are based on a plurality of tracking bits (e.g., the tracking bits 126(0)-126(X) of FIG. 1) that each correspond to an instruction of a plurality of instructions (such as the instructions 108(0)-108(X) of FIG. 1) within the fetch pipeline portion 110 (block 318). For example, the remote processor 102(P) may determine that all instructions having tracking bits 126(0)-126(2) set to a first value have proceeded from the fetch pipeline portion 110 to the execution pipeline portion 112 (block 320). The exemplary operations then continue at block 322 of FIG. 3C.

Referring now to FIG. 3C, in response to determining that all instructions within the fetch pipeline portion 110 that were potentially fetched using address translations older than the IFPS request 122 have proceeded from the fetch pipeline portion 110 to the execution pipeline portion 112, the remote processor 102(P) performs a series of instructions (block 322). The remote processor 102(P) performs a DSB operation (block 324). The remote processor 102(P) then issues a synchronization acknowledgement (e.g., the synchronization acknowledgement 124 of FIG. 1) to the issuing processor 102(0) (block 326).

The processor-based device according to aspects disclosed herein and discussed with reference to FIGS. 1, 2A-2B, and 3A-3C may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 4:
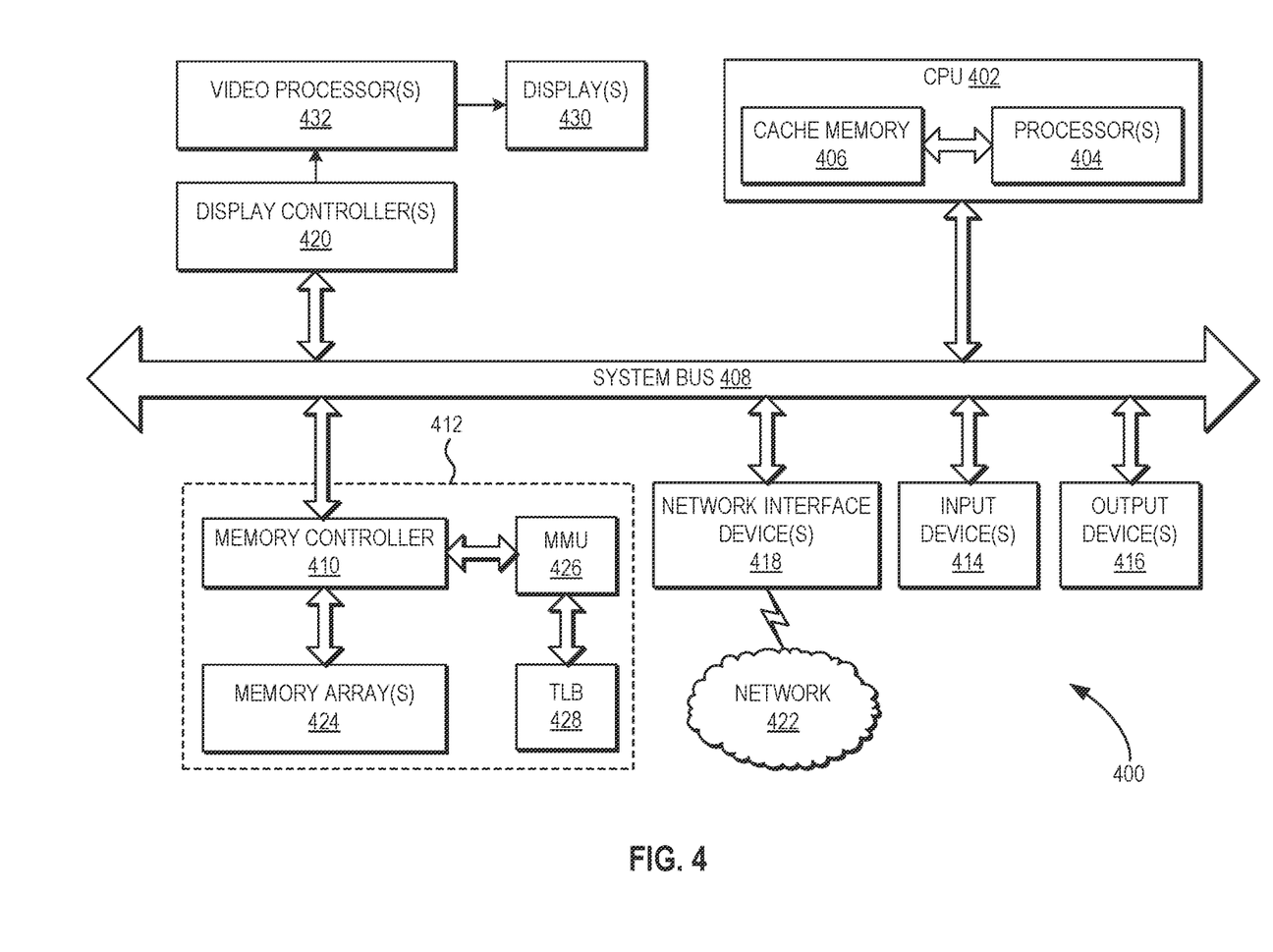
FIG. 4 is a block diagram of an exemplary processor-based device that can include the remote processor of FIG. 1.

In this regard, FIG. 4 illustrates an example of a processor-based device 400 as illustrated and described with respect to FIGS. 1, 2A-2B, and 3A-3C. In this example, the processor-based device 400 corresponds in functionality to the processor-based device 100 of FIG. 1, and may be configured according to FIGS. 1, 2A-2B, and 3A-3C and perform the operations described above with reference thereto. The processor-based device 400 includes a CPU 402 which comprises one or more processors 404 coupled to a cache memory 406. The processor(s) 404 is also coupled to a system bus 408 and can intercouple devices included in the processor-based device 400. As is well known, the processor(s) 404 communicates with these other devices by exchanging address, control, and data information over the system bus 408. For example, the processor(s) 404 can communicate bus transaction requests to a memory controller 410. Although not illustrated in FIG. 4, multiple system buses 408 could be provided, wherein each system bus 408 constitutes a different fabric.

Other devices may be connected to the system bus 408. As illustrated in FIG. 4, these devices can include a memory system 412, one or more input devices 414, one or more output devices 416, one or more network interface devices 418, and one or more display controllers 420, as examples. The input device(s) 414 can include any type of input device, including, but not limited to, input keys, switches, voice processors, etc. The output device(s) 416 can include any type of output device, including, but not limited to, audio, video, other visual indicators, etc. The network interface device(s) 418 can be any devices configured to allow exchange of data to and from a network 422. The network 422 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 418 can be configured to support any type of communications protocol desired. The memory system 412 can include the memory controller 410 coupled to one or more memory arrays 424 and a memory management unit (captioned as "MMU" in FIG. 4) 426, which may be coupled to a TLB 428.

The processor(s) 404 may also be configured to access the display controller(s) 420 over the system bus 408 to control information sent to one or more displays 430. The display controller(s) 420 sends information to the display(s) 430 to be displayed via one or more video processors 432, which process the information to be displayed into a format suitable for the display(s) 430. The display(s) 430 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A processor-based device, comprising:
a plurality of processors comprising a remote processor, the remote processor comprising an instruction processing circuit comprising a fetch pipeline portion and an execution pipeline portion; and
the remote processor configured to:
receive, from an issuing processor, a translation lookaside buffer (TLB) invalidation (TLBI) request indicating a request to invalidate an address translation;
subsequently receive an instruction fetch pipeline synchronization (IFPS) request from the issuing processor; and
responsive to receiving the IFPS request:
determine that any previously received TLBI requests including the TLBI request have completed;
determine that all instructions within the fetch pipeline portion that were potentially fetched using address translations older than the IFPS request have proceeded from the fetch pipeline portion to the execution pipeline portion; and
responsive to determining that all instructions within the fetch pipeline portion that were potentially fetched using address translations older than the IFPS request have proceeded from the fetch pipeline portion to the execution pipeline portion:
perform a data synchronization barrier (DSB) operation; and
issue a synchronization acknowledgement to the issuing processor.

2. The processor-based device of claim 1, wherein:
the IFPS request is broadcast by the issuing processor responsive to execution of a DSB instruction of an instruction set architecture (ISA) of the issuing processor;
the DSB instruction is modified to comprise an indicator bit; and
the remote processor is configured to determine that all instructions within the fetch pipeline portion that were potentially fetched using address translations older than the IFPS request have proceeded from the fetch pipeline portion to the execution pipeline portion responsive to the indicator bit being set.

3. The processor-based device of claim 1, wherein the IFPS request is broadcast by the issuing processor responsive to execution of a new instruction fetch pipeline synchronization instruction.

4. The processor-based device of claim 1, wherein the remote processor is configured to determine that all instructions within the fetch pipeline portion that were potentially fetched using address translations older than the IFPS request have proceeded from the fetch pipeline portion to the execution pipeline portion based on a plurality of tracking bits that each correspond to an instruction of a plurality of instructions within the fetch pipeline portion.

5. The processor-based device of claim 4, wherein:
the plurality of tracking bits of the plurality of instructions within the fetch pipeline portion of the instruction processing circuit are set to a first value;
the remote processor is further configured to, further responsive to receiving the IFPS request, set one or more tracking bits of one or more new instructions entering the fetch pipeline portion to a second value; and
the remote processor is configured to determine that all instructions within the fetch pipeline portion that were potentially fetched using address translations older than the IFPS request have proceeded from the fetch pipeline portion to the execution pipeline portion by being configured to determine that all instructions having tracking bits set to the first value have proceeded from the fetch pipeline portion to the execution pipeline portion.

6. The processor-based device of claim 1, wherein:
the remote processor further comprises a TLB comprising a plurality of TLB entries; and
the remote processor is further configured to, responsive to receiving the TLBI request, invalidate a TLB entry of the plurality of TLB entries of the TLB corresponding to the address translation.

7. The processor-based device of claim 6, wherein the TLB comprises one of an instruction TLB (iTLB) and a data TLB (dTLB) of the remote processor.

8. A processor-based device, comprising:
means for receiving, from an issuing processor, a translation lookaside buffer (TLB) invalidation (TLBI) request indicating a request to invalidate an address translation;
means for subsequently receiving an instruction fetch pipeline synchronization (IFPS) request from the issuing processor;
means for determining that any previously received TLBI requests including the TLBI request have completed, responsive to receiving the IFPS request;
means for determining that all instructions within a fetch pipeline portion of an instruction processing circuit of a remote processor of a plurality of processors of the processor device that were potentially fetched using address translations older than the IFPS request have proceeded from the fetch pipeline portion to an execution pipeline portion of the instruction processing circuit;
means for performing a data synchronization barrier (DSB) operation, responsive to determining that all instructions within the fetch pipeline portion that were potentially fetched using address translations older than the IFPS request have proceeded from the fetch pipeline portion to the execution pipeline portion; and
means for issuing a synchronization acknowledgement to the issuing processor.

9. A method for performing instruction fetch pipeline synchronization (IFPS) in processor-based devices, comprising:
receiving, by a remote processor of a plurality of processors of a processor-based device from an issuing processor, a translation lookaside buffer (TLB) invalidation (TLBI) request indicating a request to invalidate an address translation;

subsequently receiving, by the remote processor, an instruction fetch pipeline synchronization (IFPS) request from the issuing processor; and responsive to receiving the IFPS request:
 determining, by the remote processor, that any previously received TLBI requests including the TLBI request have completed;
 determining, by the remote processor, that all instructions within a fetch pipeline portion of an instruction processing circuit of the remote processor that were potentially fetched using address translations older than the IFPS request have proceeded from the fetch pipeline portion to an execution pipeline portion of the instruction processing circuit; and
 responsive to determining that all instructions within the fetch pipeline portion that were potentially fetched using address translations older than the IFPS request have proceeded from the fetch pipeline portion to the execution pipeline portion:
  performing, by the remote processor, a data synchronization barrier (DSB) operation; and
  issuing, by the remote processor, a synchronization acknowledgement to the issuing processor.

10. The method of claim 9, wherein:
the IFPS request is broadcast by the issuing processor responsive to execution of a DSB instruction of an instruction set architecture (ISA) of the issuing processor;
the DSB instruction is modified to comprise an indicator bit; and
determining that all instructions within the fetch pipeline portion that were potentially fetched using address translations older than the IFPS request have proceeded from the fetch pipeline portion to the execution pipeline portion is responsive to the indicator bit being set.

11. The method of claim 9, wherein the IFPS request is broadcast by the issuing processor responsive to execution of a new instruction fetch pipeline synchronization instruction.

12. The method of claim 9, wherein determining that all instructions within the fetch pipeline portion that were potentially fetched using address translations older than the IFPS request have proceeded from the fetch pipeline portion to the execution pipeline portion is based on a plurality of tracking bits that each correspond to an instruction of a plurality of instructions within the fetch pipeline portion.

13. The method of claim 12, wherein:
the plurality of tracking bits of the plurality of instructions within the fetch pipeline portion of the instruction processing circuit are set to a first value;
the method further comprises, further responsive to receiving the IFPS request, setting one or more tracking bits of one or more new instructions entering the fetch pipeline portion to a second value; and
determining that all instructions within the fetch pipeline portion that were potentially fetched using address translations older than the IFPS request have proceeded from the fetch pipeline portion to the execution pipeline portion comprises determining that all instructions having tracking bits set to the first value have proceeded from the fetch pipeline portion to the execution pipeline portion.

14. The method of claim 9, wherein:
the remote processor further comprises a TLB comprising a plurality of TLB entries; and
the method further comprises, responsive to receiving the TLBI request, invalidating a TLB entry of the plurality of TLB entries of the TLB corresponding to the address translation.

15. The method of claim 14, wherein the TLB comprises one of an instruction TLB (iTLB) and a data TLB (dTLB) of the remote processor.

16. A non-transitory computer-readable medium, having stored thereon computer-executable instructions that, when executed, cause a processor of a processor-based device to:
receive, from an issuing processor, a translation lookaside buffer (TLB) invalidation (TLBI) request indicating a request to invalidate an address translation;
subsequently receive an instruction fetch pipeline synchronization (IFPS) request from the issuing processor; and
responsive to receiving the IFPS request:
 determine that any previously received TLBI requests including the TLBI request have completed;
 determine that all instructions within a fetch pipeline portion of an instruction processing circuit of a remote processor of a plurality of processors of the processor-based device that were potentially fetched using address translations older than the IFPS request have proceeded from the fetch pipeline portion to an execution pipeline portion of the instruction processing circuit; and
 responsive to determining that all instructions within the fetch pipeline portion were potentially fetched using address translations older than the IFPS request have proceeded from the fetch pipeline portion to the execution pipeline portion:
  perform a data synchronization barrier (DSB) operation; and
  issue a synchronization acknowledgement to the issuing processor.

17. The method of claim 16, wherein:
the IFPS request is broadcast by the issuing processor responsive to execution of a DSB instruction of an instruction set architecture (ISA) of the processor-based device;
the DSB instruction is modified to comprise an indicator bit; and
the computer-executable instructions cause the processor to determine that all instructions within the fetch pipeline portion that were potentially fetched using address translations older than the IFPS request have proceeded from the fetch pipeline portion to the execution pipeline portion responsive to the indicator bit being set.

18. The method of claim 16, wherein the IFPS request is broadcast by the issuing processor responsive to execution of a new instruction fetch pipeline synchronization instruction.

19. The method of claim 16, wherein the computer-executable instructions cause the processor to determine that all instructions within the fetch pipeline portion that were potentially fetched using address translations older than the IFPS request have proceeded from the fetch pipeline portion to the execution pipeline portion based on a plurality of tracking bits that each correspond to an instruction of a plurality of instructions within the fetch pipeline portion.

20. The method of claim 19, wherein:

the plurality of tracking bits of the plurality of instructions within the fetch pipeline portion of the instruction processing circuit are set to a first value;

the computer-executable instructions further cause the processor to, further responsive to receiving the IFPS request, set one or more tracking bits of one or more new instructions entering the fetch pipeline portion to a second value; and the computer-executable instructions cause the processor to determine that all instructions within the fetch pipeline portion that were potentially fetched using address translations older than the IFPS request have proceeded from the fetch pipeline portion to the execution pipeline portion by causing the processor to determine that all instructions having tracking bits set to the first value have proceeded from the fetch pipeline portion to the execution pipeline portion.

\* \* \* \* \*